United States Patent Office 3,636,194
Patented Jan. 18, 1972

3,636,194
COMPOSITION AND METHOD FOR TREATING MASTITIS WITH THERAPEUTIC AGENTS
Douglas G. Parizeau, 842 Cedar Terrace,
Westfield, N.J. 07090
No Drawing. Continuation-in-part of application Ser. No. 580,862, Sept. 21, 1966. This application Oct. 23, 1969, Ser. No. 868,907
Int. Cl. A61k 21/00
U.S. Cl. 424—115     16 Claims

ABSTRACT OF THE DISCLOSURE

Preparations and methods for treating animal mastitis as by intramammary infusion involve a composition comprising therapeutic agent material in an oil base containing lecithin-type material that consists essentially of alcohol-soluble phospholipid or phospholipids, whereby distribution of the composition in the affected region is promoted, with further improved results, e.g. in avoiding adverse effects on the therapeutic agent material and in affording short milk-out times.

---

This application is a continuation of my abandoned application Ser. No. 580,862, filed Sept. 21, 1966 for Composition and Method for Treating Mastitis with Therapeutic Agents.

This invention relates to the treatment of animal mastitis and more particularly to compositions and methods for treating disorders of this kind in milk animals, a special feature of the invention being concerned with new and improved vehicles or carriers whereby chemotherapeutic agents can be administered to the affected regions. The new compositions have special advantages in one or more of the respects of effectiveness, improved rapidity of action, chemical stability of the active agents, and suitable milking-out properties, in the treatment of acute and chronic mastitis by infusion of the composition into the udders of milk animals.

As is well known, mastitis of the milk canal or system of cows, which includes such disorders or infections occurring in the teat canal, teat cistern, milk cistern, milk ducts and aveoli, is an important problem in the dairy industry. The diseased condition, which occurs both in acute and chronic forms, is ordinarily the result of infection by one or more microorganisms, especially such as *Streptococcus agalactiae, Streptococcus dysgalactiae, Staphylococcus aureus, Aerobacter aerogenes, Escherichia coli, Pseudomonas aeruginosa* and *Corynebacteria pyogenes.* Each year mastitis causes important losses to the whole dairy industry and an improvement in modes of treatment is highly desirable to reduce the time when milk production by the animal is not useful to the dairy operator, both by reason of the occurrence of the disorder and by reason of the time required for treatment. The problem is of large significance, in the dairy industry, with milk cows, and for convenience references herein will be directed essentially to such situation, but it will be understood that mastitis also occurs with other lactating animals such as dairy goats, and the compositions and methods of the present invention are applicable in such cases as well.

Various therapeutic agents have been utilized in compositions for infusion into the affected areas, especially antibiotics having activity against microorganisms of the kinds named above, and indeed also other chemotherapeutic substances such as one or more of the sulfonamides. Penicillin has been found of prime importance in treating the infections, and a chief aspect of the present invention is the provision of improved compositions for administering this agent. Other antibiotics for which utility has been indicated against mastitis are streptomycin (or dihydrostreptomycin), neomycin, polymyxin and the tetracycline group, including oxytetracycline and chlortetracycline. Other chemotherapeutic substances indicated for use against this type of disorder have included sulfonamide and cortisone groups, as for example sulfamethazine, sulfamerazine, sulfathiazole and hydrocortisone, yet another agent being nitrofurazone.

The base or vehicle compositions of the present invention are applicable to a useful extent with these agents, or more generally, a considerable variety of active compounds, which are to be brought into contact with the affected membranes, tissues and spaces. It will be understood that the present invention is in its more general aspects not related to a particular combination of agents or the like, but affords an improved way of administering a desired medication as may be prescribed or determined, e.g. in accordance with the causative organism or nature of the disease.

Preparations for treating mastitis must ordinarily be such that they can be infused or otherwise introduced through the teat canal, with the aim of achieving distribution throughout the milk system of the udder, for effective action over the infected areas, commonly in the presence of milk as continuously secreted. Such preparations have several special requirements, not all of which have been wholly appreciated, or which are such that deficiencies in meeting them may not have been fully understood with respect to presently available products. In general, a preparation is employed one or optionally several times, after the animal has been milked, as for example, after each of two or three successive milkings separated by the conventional 12-hour periods, the desire being that the active agent or agents will accomplish their inhibitory or other function against the causative microorganisms through the time following each application.

A primary requirement of a composition for these purposes is that the active agent or agents should not be adversely affected by the ingredients of the base or carrier. Particular difficulty arises in the case of penicillin, as for example procaine penicillin, in that it tends to be unstable, in a chemical sense in various environments. Thus aqueous suspensions may appear desirable because of ready mixing with the milk of the cows' udder, but there is definite tendency of penicillin, and some other antibiotics, to be unstable in water. Study involved in the attainment of the discovery upon which the present invention is predicated, has indicated that a number of agents which might appear to be useful in compounding a preparation for treatment of mastitis, are or may be deleterious to the antibiotic content. Thus in particular where it is sought to embody penicillin or other active substances in a nonaqueous vehicle, surface active substances or other materials intended to promote mixing with milk have appeared to be detrimental, in chemical impairment of the antibiotic or in depressing its activity. Substances of this character include various well known derivatives of sorbitan fatty acid esters, glycols, and the like.

For effectiveness it is apparent that the composition, when infused into the udder, must be brought readily to the localities of infection and must not be adversely affected by milk or other physiological conditions. There is reason to believe that penicillin, for example, can be depressed in activity or hampered in function by milk itself, so that carriers or bases that are soluble in milk may be undesirable as subjecting the antibiotic to a deleterious environment. These difficulties arise also with a number of other chemotherapeutic agents.

At the same time, the carrier must be physically such as to promote dispersion of the antibiotic while suspended or dissolved in it, and should not interfere with access of the antibiotic to affected areas. Thus, for example, certain gel compositions have been deemed useful, in avoiding other disadvantages, yet their release of the antibiotics appears to be relatively slow, so that it is difficult to reach an effective level of antibiotic, at or adjacent the various tissues and membranes, within a desirably short time, or even at any time.

As is well known, there is a basic requirement in all cases that any introduced substance which is undesirable in milk, be eliminated from the udder in as few milkings as possible after the course of treatment. The requirements in this respect, having regard to the conventional practice of milking a cow at 12-hour intervals, are customarily expressed in number of hours needed for milking out the contaminating material. Thus an accepted mode of defining the milking-out characteristics of a given preparation is to regard the last treatment, whether it is a single treatment or the last of several successive ones, as the zero hour, and then to rate the preparation by the total number of hours (calculated in multiples of 12) during which undesirable substances are present or present in unacceptable amounts in the milk. Hence for example, if a preparation has been infused into the udder at three successive milking times, so that the third treatment represents the zero hour, and if the milk is still contaminated at the fifth following milking, but is acceptably clear at the next milking (i.e. the 72-hour milking), then the preparation is said to have a 60-hour rating. In other words, the milk must be discarded, and not used for food purposes, at each of the 12-hour milking times, for a total of 60 hours following the completion of treatment. Conventionally, moreover, the rating is based on a set of three successive treatments, but usually must be complied with, for a lesser number of treatments. Thus in the above instance if there is only one treatment with a preparation rated at 60 hours it is usually required that the milk still be dscarded over the entire 60-hour interval following such treatment. Of course when there is a set of two or three treatments, the milk collected immediately preceding the second and third must also be discarded, but the rating time is commonly expressed, as stated, with respect only to the milkings subsequent to the last of the treatments.

As will be appreciated it is ordinarily desirable that a preparation have a relatively low milking-out rate, to reduce production loss to the dairy or farmer. A disadvantage with many preparations now available is that the milk-out rating is quite long, often as much as 72 hours or more. The several antibiotics, including penicillin and indeed essentially all of the chemotherapeutic agents used in these compositions, are deemed unsuitable for milk, and acceptable levels of concentration are practically zero or small trace amounts. The nature of the vehicle is a significant factor, in that some vehicles appear to delay the removal of the active agents unduly, an while the medicating substances themselves may inherently have different characteristics of removal, the vehicle can affect such characteristics differently in the case of the various agents.

A special problem in milking-out resides in the nature of the vehicle. Whereas a number of vegetable oils are recognized as foods themselves or are otherwise innocuous, and thus may be permitted in milk at some levels, other materials are not regarded as tolerable, and if they tend to milk-out slowly, give the composition an undesirably long rating. Substances of this class include a considerable variety of wetting agents such as have been mentioned hereinabove, as well as gel-forming or similar substances, for instance aluminum stearate. In other words, undue length of milk-out time may arise from a number of factors, for example in that slowness of the entire vehicle in being eliminated may delay removal of the active medicaments with it, or undesirable components of the vehicle may be slow to come out, even though the active agents have substantially disappeared in earlier milkings.

An important object, in the case of preferred compositions according to the present invention, is to provide preparations for treatment of mastitis which have a satisfactorily low milk-out rating, and which, more generally, permit good effectiveness of the therapeutic agents, e.g. allowing useful dosage levels, while not requiring long milk-out times. Although an extremely short milk-out may conceivably be regarded as disadvantageous in at least some cases, as for example where such characteristic is an indication that the antibiotics or the like are not persisting sufficiently for their task, it is well recognized that reasonably short removal periods are entirely consistent with medical effectiveness, as for example where a content of antibiotics or the like is present in the second or third milking, but the milk is correspondingly clear thereafter.

Some physical components now or heretofore in use for mastitis preparations have been mentioned above, including various surface-active agents. Another prior vehicle has comprised a gel consisting of peanut oil or mineral oil, and aluminum monostearate. In other compositions, non-active materials have included such things as silica preparations or freons, the object generally being to promote the access of the antibiotics to the affected localities or to avoid depressant or other hindering effect on the medication. Nevertheless, it has now been found that mastitis preparations presently available, whether of water-base or oil-base type and whether in the form of a liquid, ointment, jelly or other solid or semi-solid nature, are deficient or less than fully satisfactory in one or more of the respects noted above.

The present invention involves the discovery that one or more of the foregoing objects are well achieved, and the several important criteria which have now been found to measure the effectiveness and efficiency of utilization of antibiotic or like agents in the treatment of mastitis, as outlined above, are served in unusually satisfactory manner by employing a vehicle or carrier for the antibiotics or other active agents which comprises an oil base that includes additive material of novel character in preparations of this class. The novel constituent which is incorporated with the oil base, for example a vegetable oil, and which in the defined combination affords the attainment of an unusually superior vehicle for the mastitis compositions, is a selected material of the category of phospholipids, the phospholipids being phosphatides that are generally identified as constituting or contained in products known as lecithin. More specifically, the special class of phospholipids which has been found uniquely suitable for the present invention consists of those which are alcohol-soluble, reference to alcohol solubility as identification of appropriate substances meaning solubility in ethanol and in its broader sense including substances of moderate as well as high solubility in that respect (unless otherwise indicated, the term alcohol is used in this specification and in the claims as synonymous with ethanol). Thus a chief example of material suitable for addition to vegetable oil or the like to provide the novel vehicle is a so-called alcohol-soluble fraction of lecithin, the latter term being employed in such connection to denote commercial lecithin.

It may be explained that lecithin, in its conventional commercial form, as produced from soybean, comprises three major phospholipids of mutually distinguishable nature, being respectively the so-called chemical lecithin, cephalin, and inositol phosphatide. Chemical lecithin, also sometimes called phosphatidyl choline, is identified as being rather highly soluble in alcohol, and the somewhat similar cephalin, also sometimes known as phosphatidyl ethanolamine, is characterized by some or moderate alcohol solubility. On the other hand, the inositol phospholipids or inositol phosphatides represent material which is essentially insoluble in alcohol. These three phospholipids or types of phospholipid are usually found in roughly equal quantities in commercial lecithin products or so-called natural lecithin, whether the total of them is 90%, more or less, of the product as in the case of essentially oil-free lecithin, or in about 60% to 65% in the situation of oil-base lecithin (the balance being then chiefly soybean oil). An available alcohol-soluble fraction of the described natural lecithin contains, roughly, chemical lecithin and chemical cephalin in mutual proportions of about two to one by weight, with a slight amount of inositol phospholipid, and with accompanying soybean or other vegetable oil depending on the grade of the substance and whether it is in solid or partly or substantially fluid form. This alcohol-soluble fraction has been found highly effective for the novel vehicles of the present invention, whereas in contrast known alcohol-insoluble fractions of natural lecithin, containing inositol phospholipid and cephalin in proportions of roughly two to one, with only a small amount of chemical lecithin, are unsuitable.

While alcohol-soluble fractions of natural lecithin, such as described above, are presently preferred because of readiy availability, it will be understood that single substances or other mixtures of substances of the stated, specific class, are also appropriate for use, including particularly chemical lecithin and cephalin. Moreover, it will be appreciated that phospholipids, or lecithin material, produced from other vegetable or indeed animal sources can be utilized, to the extent such substances come within the category of alcohol-soluble phospholipids as explained above. Thus, for example, lecithin products are obtainable from a variety of sources, including peanuts, corn and other vegetable materials, and likewise from materials of animal nature such as egg yoke, brain tissue and even milk itself. For instance, egg powder can be extracted with ethanol, ether and chloroform, to yield an extract which is thereafter concentrated and poured into excess acetone while stirring, yielding a precipitate which comprises phospholipids, that may be further purified by precipitation with acetone. Phospholipids of this character, as well as phospholipids obtainable by identical procedure from whole milk powder, include chemical lecithin, cephalin and similar phospholipids, and to the extent identifiable as alcohol-soluble, are conceived to be appropriate for the present invention. It will be understood that while these substances are chemically recognized, and indeed fairly identified by chemical groupings or types of chemical grouping, complete chemical identification is not reliably available and indeed is not necessary for present purposes. Indeed it is believed that identification by alcohol solubility is an effective classification of phospholipids useful in the invention, it being understood that this is essentially a matter of definition in the discovery, inasmuch as the property of alcohol solubility does not appear to play, of itself, any necessary part in the actual function of the substance in preparations for treating mastitis.

The vehicle or base of the invention, in presently preferred embodiments, thus consists essentially of a pharmaceutically acceptable oil and alcohol-soluble phospholipid material as explained above. In making up the composition for treating mastitis, e.g. by intramammary infusion, the desired antibiotic or other active agent material is incorporated in the vehicle or the oil thereof, in pharmaceutically appropriate amount. In one specific aspect, as also explained, the invention is related to penicillin preparations, the mastitis composition thus comprising an effective quantity of penicillin, for instance procaine, penicillin, together with the defined base, and such other active agents, if any, as may be desired. In accordance with a further, specific feature of the invention, the oil of the base is vegetable oil, such as peanut oil, which is suitable for carrying penicillin and any other active substances, and which has been found fully appropriate for dispersion in milk and thus for the described treatment where the presence of milk is to be expected. With the composition made up to consist essentially of the materials named above, other ingredients may be present for appropriate function as will now be readily appreciated, for example small amounts of preservatives for the vegetable oil, some content of the same or another vegetable oil in hydrogenated form if desired to thicken the mixture, and indeed small amounts of neutral or similar agents as may be found appropriate to achieve an optimum environment for the antibiotic or antibiotics, as for instance a sugar such as lactose.

The new mastitis compositions are found to serve the intended function in markedly superior manner. As prepared in a dosage unit, such as 10 cc. or 15 cc. suitable for infusion in one quarter of the udder, the composition preserves the penicillin an other antibiotics in substantially full strength over long periods of time prior to use and is readily introduced by infusion into the udder through thhe teat canal as explained above. The preparation may be in purely liquid form or alternatively in thickened or ointment-like state if desired. On administration, the composition appears to penertate well throughout the affected region and to provide effective utilization of the active agent content at the several areas of tissue or membrane to be treated.

Tested separately with quantities of whole milk, the preparation is found to disperse in an unusually satisfactory manner, the resulting dispersion having a markedly higher antibiotic potency than prior mastitis-treating material which has heretofore been widely used and with which the new composition has been compared. The presence of milk, moreover, was not found to depress or otherwise impair the antibiotics, even over relatively considerable time intervals comparable to periods during which the preparation might be allowed or desired to remain in the udder. Thus the compositions have unique superiority in providing useful dispersion in milk without adverse deterioration of antibiotic effectiveness.

Finally, it is found that the new preparations milk out quite satisfactorily, i.e. in materially shorter times than with compositions that have been available heretofore. That is to say, the compositions can be made to have ratings as low as 36 hours for the several principal antibiotic agents, especially penicillin and indeed others such as streptomycin, neomycin and the like. At the same time the constituents of the vehicle, e.g. the vegetable oil and the phospholipids, are regarded as food materials and under the described circumstances do not require a prolongation of the milk-out rating. Although in general the entire composition is believed to be effectively removed by the time the milk is clear of the antibiotics, persistence of the vehicle ingredients, as in small amounts, can be fully tolerated, without in any way affecting the official requirements or marketability for milk or its complete suitability for use.

While the precise mode of function of the improved vehicle does not, in a general sense, need to be known for ordinary utilization of the invention, it is believed that the defined alcohol-soluble phospholipid effectuates dispersion of the oil, carrying the active agents suspended or dissolved therein by forming or tending to form an oil-in-water type of emulsion with the milk in the udder. That is to say, as distinguished from solution in the aqueous phase of milk, the result of admixture of the composition is of the nature of an emulsion, where the milk or its aqueous phase remains continuous. The term emulsion is here employed to define the nature of the dispersion as at present appears; a truly permanent emulsion is probably not formed, and indeed does not seem necessary, and to the extent that agitation is required to establish or preserve the dispersion, the natural activity of the cow and movement of the treated parts seems sufficient for such purpose. It will be noted, moreover, that the dispersing effect of the novel additive is realized in the conditions of the udder, i.e. in the presence of milk, and is not basically a concern of the preparation prior to infusion. Indeed the composition may be such that some or all of the solid constituents may tend to settle during storage, but simple shaking is enough to suspend them for the period of infusion, and it is thereafter that the dispersion-promoting function is believed to come into play.

As stated, vegetable oil has been found particularly suitable for the vehicle, examples being peanut oil, sesame oil, corn oil, cottonseed oil, soybean oil and olive oil, or indeed any vegetable oil recognized as pharmaceutically acceptable. While this and other ingredients of the composition should be free of undesirable contaminants, it may be noted that official requirements for compositions administered as explained above do not demand biologically sterile conditions. In a broader aspect, is is conceived that other pharmaceutically acceptable oil may be employed, in part or in whole, as for example mineral oil, although in such event, the milk-out specifications may require that the milk be completely clear of such oil in order to be available for human consumption.

The phospholipid material is conveniently used in a minor proportion, it being found that even very small quantities of alcohol-soluble phospholipids are suitable. Considering commercial products of the type now available which contain from 60% to 65% (by weight) of alcohol-soluble phospholipids, it appears that good results are achieved with as little as 0.75% of such product, based on the weight of peanut oil or the like. In these compositions, chemical lecithin may usually represent up to about two-thirds and cephalin down to about one-third of the total content of these two alcohol-soluble phosphatides. It is presently believed that chemical lecithin is particularly effective, having excellent hydrophilic properties and in consequence compositions where the desired phospholipid content contains at least half or its major part of chemical lecithin, are presently preferred. Inositol phospholipid, being the third major constituent of ordinary commercial or natural lecithin, is not effective, nor are lecithin fractions which contain a major proportion of inositol phosphatide and a minor proportion of cephalin. It is presently impractical to produce phospholipids completely free of the inositol fraction, there usually being at least 2% or 3%, or perhaps more, of such material in available products that are nevertheless appropriately described as alcohol-soluble. Large proportions of inositol phospholipids, in the phospholipid material for mastitis compositions as described herein, cannot be permitted, since the desired hydrophilic properties are interfered with and the intended emulsion in the milk cannot be achieved. While it is thought that amounts of inositol phospholipid up to 5% or perhaps even up to 10% of the total phospholipid material (measured as such) may be tolerated, it is difficult to determine these concentrations accurately, whereas it is a relatively simple matter to ascertain by test whether a given phospholipid material is sufficiently free of inositol content as to serve the present purposes. Material suitably low in inositol, when embodied in vegetable oil in a proportion of, say, 2%, forms a ready emulsion in milk, whereas if an undesirable content of inositol phospholipid is present, such fact can be detected by the visual absence of any maintained emulsified condition, i.e. such as should remain over at least a period of minutes.

Considering the alcohol-soluble phospholipid material as measured by itself, quantities as small as 0.4% appear useful in the vegetable oil base, and indeed according to present understanding amounts upwards of 0.25%, especially if a major part is chemical lecithin, are useful, for dispersibility in milk. Upper limits of the additive are dictated largely by economic considerations, 4% of commercial products (containing 60% phospholipids) being usually more than ample, although quantities of the latter as high as 10% are conceivably useful, or alternatively up to 7% of the phospholipid measured as such. As also indicated above, the classification of phospholipids between alcohol-soluble and alcohol-insoluble substances is somewhat relative but is generally recognized, the inositol phospholipids being regarded as relatively insoluble. A functional characteristic of the selected phospholipids is their hydrophilic properties, promoting dispersion of the oil base (in which the phospholipids are dissolved) in aqueous liquid, such as milk, by oil-in-water emulsification.

The active agents, in the complete compositions, may be employed in amounts conventional for such substances, and the quantities to be used in any given case will therefore be readily understood without extended discussion herein. Instances of appropriate quantities are given in various examples below. Whereas it is believed that the present vehicle may permit the use of somewhat lesser amounts than heretofore deemed necessary for effectiveness, and the invention extends to such situations, it is thought that oridinarily the amounts may correspond to current recommendations of veterinarian practice, with the advantage of enhanced efficacy. Reference to agents active against mastitis is used to include essentially any agents employed in reducing or alleviating the causative infection or its symptoms. For instance, hydrocortisone has been employed because of its anti-inflammatory effect in the mammary gland; while antibacterial agents such as penicillin, polymyxin and others, may also be required to combat the infection, a substance such as hydrocortisone is nevertheless within the class of active agents, at least because the reduction in inflammation aids in early return to normal milk secretion and is a favorable influence on restoration of healthy, milk-producing conditions.

The following are examples of compositions representative of the invention, with test data demonstrating the results achieved. Many of these were made up to include a relatively large variety of active agents, to demonstrate the suitability of the vehicle for use with all of them; in practice effective compositions may employ fewer active agents, or indeed no more than one or two. In an references to commercial lecithin products, it will be understood that these products in all cases were prepared to be free of undesirable contaminants which are antagonistic to penicillin, i.e. contaminants such as benzoyl peroxide, sometimes used to bleach lecithin, and such as propylene glycol and oleic acid, employed to make certain lecithin products more fluid and easier to handle. As in the examples, the invention is notably useful with procaine penicillin, which has good stability and is effectively carried and maintained by the new vehicle adjacent the areas that require treatment, but in a more general sense the use of other forms of penicilin, such as potassium penicillin, is not excluded.

EXAMPLE 1

Two percent of an alcohol-soluble fraction of lecithin known as Clearate SO and herein identified as SO phospholipid, was added to peanut oil, and the mixture was heated to 140° F. to dissolve the lecithin fraction, the SO phospholipid. This SO phospholipid was identified as containing 60% to 65% acetone insoluble materials, i.e. phospholipid materials, which are mainly chemical lecithin and cephalin. One percent of hydrogenated peanut oil was also added to give some thickness or body to the preparation, with the view of increasing the viscosity and inhibiting the settling out of ingredients of the mastitis syringe.

Further ingredients, including active agents, were added as follows, in proportions such that each 10 cc. of the product contained, in addition to the above oil base, the following:

Procaine penicilin—100,000 units
Dihydrostreptomycin base—100 mg.
Neomycin base—50 mg.
Polymyxin B sulfate—50,000 units
Hydrocortisone acetate—20 mg.
Nitrofurazone—150 mg.
Polyvinylpyrrolidone (PVP)—200 mg.
Sulfamerazine—250 mg.
Sulfamethazine—250 mg.
Sulfathiazole—250 mg.
Lactose—200 mg.
Chlorbutanol anhydrous—50 mg.
Methylparaben—10 mg.
Propylparaben—5 mg.

The methylparaben, propylparaben and chlorobutanol were added for conventional function as preservatives, e.g. for the peanut oil. The active ingredients will be readily recognized as such, the PVP being active in anti-inflammatory function and it also being noted that the composition includes several sulfa compounds.

After the ingredients were thoroughly mixed in the described oil base, including the SO phospholipid material (essentially all of the active materials appearing to be insoluble in the oil), the composition was passed through a homogenizer and filled into plastic syringes in amount of 10 cc. in each. Syringes are one conventional means for introducing liquid or semi-liquid preparations into the milk canal for treating mastitis, common dosage amounts being in the range of 10 cc. to 15 cc.

The composition was tested for stability of the principal agent, penicillin, by putting the syringes on heat tests at 5° C. and 45° C. and also by maintaining some syringes at room temperature. Initially assay of the composition for penicillin showed 116,000 units per syringe; after five and one-half weeks at 5° C. the 5 syringes were still assaying 100,000 units of penicillin each. At the 45° C. level, the syringes were held for three months and at the end assayed at the original value, 116,000 units. The room temperature sample was likewise held for three months and maintained the assay of 116,000 units. It will be noted that the initial and some other assays were higher than as indicated in the formulation above because of a slight excess of amount of penicillin and also because the formulation was based on the assay furnished with the substance, whereas the actual assay of test demonstrated that the nominal value had been expressed conservatively or as a minimum.

The tests revealed that penicillin is chemically stable, i.e. in the sense of its potency, in the mastitis preparation described. Other evidence or knowledge of the characteristics of the remaining active agents, e.g. known properties of them as suspended in vegetable oil, gave assurance that there was no problem as to stability of these other substances. It was also noted that after the stated long times at elevated temperature and at room temperature the preparation maintained to a full degree its desired property of dispersibility in aqueous liquids such as milk and water.

EXAMPLE 2

In this instance a lecithin fraction identified as Clearate AQ, here called AQ phospholipid material, was employed, this being a product containing 60% to 65% phospholipids with the remainder essentially vegetable oil (as also in the case of the SO product above), the phosphatide content being stated as mainly chemical lecithin and it being understood that the remaining, minor part was chiefly cephalin.

The AQ phospholipid material was included in a formulation essentially the same as in Example 1, in amounts of 0.75%, 1.0% and 1.25% respectively for three products, these percentages being by weight (as elsewhere herein) and being based on the peanut oil. Two samples of each of the three preparations were tested for stability, i.e. being incubated for one month respectively at 37° C. and at 45° C. At the end of the month, each sample maintained approximately 100% of its original activity, by assay, thus demonstrating the desired stability of penicillin in the vehicles. On mixing 10 cc. of each of the products into a separate quantity of water (8 ounces) it was found that all ingredients dispersed effectively with no oily residue, similarly in all three cases.

EXAMPLE 3

As an instance of the employment of a somewhat different set of active ingredients, the preparation was made, utilizing the procedures of the above examples, to have the following composition:

Oxytetracycline base—220 mg.
Oleandomycin base—110 mg.
Neomycin base—110 mg.
Prednisolone acetate—5 mg.
SO phospholipid material—2 percent
Peanut oil q.s.—10 cc.

This preparation afforded a composition that was stable with respect to its active ingredients and that was readily dispersible in milk in the form of an oil-in-water emulsion, as desired.

EXAMPLE 4

Two further preparations were made, each containing active and minor ingredients as follows:

Procaine penicillin—110,000 units
Neomycin base—64.5 mg.
Dihydro base—220 mg.
Polymyxin base—55,000 units
Hydrocortisone acetate—22 mg.
Sulfamethazine—275 mg.
Sulfamerazine—275 mg.
Sulfathiazole—275 mg.
Nitrofurazone—66 mg.
Polyvinylpyrrolidone—220 mg.
Lactose—220 mg.
Chlorbutanol anhydrous—65 mg.
Methylparacept—11mg.
Propylparacept—5.5 mg.

The last three named of the above substances were stabilizers for the oil base, the lactose being another optional ingredient included for possible benefit to the penicillin during storage of the latter. In each of the preparations, a peanut oil base was employed containing 1.1% of hydrogenated peanut oil; the SO phospholipid fraction was used, being 2% of the oil in one preparation and 4% of the oil in the other. The products were compounded in the manner of the preceding examples, the listed quantities of active and supplemental agents being recited for 10 cc. units or samples.

Both formulations proved to be stable on heat and room temperature tests, and both appeared to be about equally effective in forming a desirable emulsion of the mixture in milk.

In other tested variations of proportions of ingredients, preparations were made according to the above examples, where the amount of penicillin was increased to 1,000,000 units, dihydrostreptomycin to 500 mg., neomycin to 350 mg., polymyxin to 100,000 units and hydrocortisone to 40 mg. In several such compositions, containing the peanut oil base, an alcohol-soluble phospholipid material (in the form of roughly 60% phospholipid products) was employed respectively in amounts ranging from 0.75% to 4% of the oil. In all cases appropriate chemical stability of the active agents was demonstrated and the preparation was readily dispersible in milk or water, again as desired.

EXAMPLE 5

In this instance a preparation was made, in accordance with the procedure of the foregoing examples, to contain 100,000 units of procaine penicillin G, per 10 cc. of the composition, the vehicle being an oil base, being peanut oil with the addition of 2% of alcohol-soluble phospholipid material, specifically a product containing about 60% phospholipids and being identified above as AQ phospholipid. This composition, identified below as HP product was compared with a known, commercially available preparation for treating mastitis by intramammary infusion, to determine release of the active agent, i.e. penicillin, under circumstances, as by dialysis through a suitable membrane, which provide significant evidence of the properties intended for the substances in use, i.e. in carrying the antibiotic into localities of infection. The comparison preparation, here identified as CP product, employed a gel-type base stated to consist of peanut oil with 3% aluminum monostearate, and contained 100,000 units of procaine penicillin G per 10 cc.

As to each of the HP and CP products, the following procedure was used: the contents of one syringe (10 cc.) were added to 50 ml. of fresh whole milk, with appropriate agitation to disperse the composition in the milk. The resulting mixture was then inserted into cellophane dialyzing tubing, and was dialyzed into a known volume of aqueous buffer solution having a pH of 6.0, being an appropriate conventional 1% buffer solution. Constant mixing of the buffer solution was effected by a magnetic stirrer. Absorbent paper disks, 12.7 mm. diameter (S. and S. No. 740–E) were dipped into the buffer solution at timed intervals. The saturated disks were then placed on agar plates that had been seeded with Bacillus subtilis, being a standard organism recommended for testing activity of penicillin. The commencement of dialysis was regarded as zero time and paper disks were dipped into the buffer solution at various, successive intervals measured from zero time, viz. at one minute, three minutes, four minutes, up to seventy-five minutes.

Thus there were two samples of preparations tested, being respectively the HP and CP products, and being dialyzed into respectively different volumes of the buffer solution. The seeded plates were of a size to accommodate a number of test disks, so that three disks of a known concentration of penicillin standard (approximating the expected potency) were placed on each plate for control purposes. At each time interval three disks, as then dipped in one of the samples, were placed on the plate having the control disks; at the end of the incubation, described below, the zones of inhibition for the three control disks of the plate were averaged to establish a control zone diameter for the plate, and the inhibition zones of the test disks were similarly averaged to afford a raw zone diameter for the plate, i.e. representing the particular time interval. A set of plates was thus prepared for each sample, similarly numbered for the same time intervals. The plates were all incubated at 37° C. for 18 hours, this length of time being sufficiently great relative to the time variation among the several test disks so that in effect all test disks received approximately the same incubation.

Following the incubation, the diameters of the zones of inhibition around all test disks were measured in millimeters. As indicated above, the inhibition zone, for control and test were recorded, as to each plate as the average of the three disks in each instance. The total of these values for the control disks, respecting all plates, was then averaged to provide an average inhibition zone diameter of the control. Taking the measured average result of test disks on each plate as representing the raw measurement of the inhibition zone for the product tested on such plate, these test values of zone measurement were then corrected, i.e. to increase or decrease their values slightly in proportion to the departure of the control zone for the same disk from the average control value. These corrected values of the test inhibition zones then represented the values determined by the study. The results of this test were as follows:

AVERAGE ZONE SIZE IN MILLIMETERS

| Plate No. | Time interval (minutes) | HP product Control | HP product Test [1] | CP product Control | CP product Test [1] |
|---|---|---|---|---|---|
| 1 | 1 | 20.7 | 24.5 | 21.0 | 20.9 |
| 2 | 8 | 20.3 | 27.7 | 20.7 | 23.5 |
| 3 | 4 | 20.7 | 28.3 | 20.7 | 24.5 |
| 4 | 3 | 21.0 | 28.5 | 20.7 | 24.8 |
| 5 | 15 | 20.3 | 29.4 | 20.0 | 26.2 |
| 6 | 30 | 20.5 | 31.0 | 20.0 | 26.7 |
| 7 | 60 | 20.3 | 32.9 | 20.0 | 29.7 |
| 8 | 60 | 19.2 | 33.5 | 20.3 | 28.1 |
| 9 | 60 | 19.7 | 34.2 | 19.2 | 29.8 |
| 10 | 60 | 20.0 | 33.7 | 19.7 | 30.2 |
| 11 | 75 | 20.0 | [2] 29.5 | 20.3 | [2] 23.7 |
| 12 | 65 | 20.0 | [2] 29.5 | 20.0 | [2] 24.5 |

[1] Corrected values.
[2] Buffer solution samples diluted 1:10 before dipping disk.

NOTE.—Average diameter of control=20.2 mm.

It is seen that the product (HP) of the invention provided a markedly higher level of penicillin activity throughout the test in that penicillin was in effect released at a much faster rate, and consistently so over a period from one to seventy-five minutes. Comparison of the diameters of inhibition zones indicates that the area of inhibition for the product of the invention was greater than for the comparison product, by about one-third or more, indeed ranging up to about 50% in the case of plate No. 11. In view of general knowledge as to the relationship between amount of penicillin and antibiotic effectiveness as indicated in tests of bacterial inhibition, the potency of the HP product can be deemed the equivalent of use of twice as much penicillin in the comparison product.

Milk residue studies were also conducted with respect to the product of the invention, i.e. studies as to milk-out time for various ingredients of significance. In these studies the preparation was formulated as in Example 1 above, except that in each 10 cc. unit, the amount of neomycin was 60 mg. and the amount of PVP was 500 mg. The peanut oil base was made to contain 2% of an alcohol-soluble phospholipid product (about 60% phospholipid in vegetable oil), being specifically the product identified as AQ phospholipid above. At the outset of these studies, assays were conducted on the several active ingredients in the preparation, and all were found to be present in indicated potency or amount. The method of the tests was as follows:

Five normal cows, lactating, Holstein type, varying in lactation from two to seven months post partum were used. Prior to initiating the study, each cow was examined physically and each quarter's milk examined by antibiotic assay methods. All quarters were found to be normal. Cows were milked at 12-hour intervals using a De Laval four quarter milker. Milk production records were kept 36 hours prior to initiating the study until the 156-hour post treatment milking.

The first treatment was thus given after the 36-hour milking, i.e. the initial period of record keeping mentioned above, a control milk sample being taken from this selected milking. Immediately following such milking, each quarter of each cow was infused with a single dose of the infusion preparation under test. The infusions were repeated at consecutive (12-hour) milkings for a total of three infusions. Milk samples were collected from the total milk of each cow. Separate samples were taken for the antibiotics, sulfas, nitrofurazone and hydrocortisone. The samples were frozen immediately after collection and stored frozen for use in the assay procedures. After assay, the remaining milk was refrozen until notification of test clearance.

All assays on the control and post treatment milks were conducted according to the methods prescribed by the United States Department of Health, Education and Welfare, Division of Food and Drugs.

The time of the third infusion was considered the zero hour for the time designations of the milkings listed below. Employing such identification, the results of the test were that no detectable residue was found for:

Penicillin at the 48-hour milking
Neomycin at the 48-hour milking
Dihydrostreptomycin at the 48-hour milking
Polymyxin at the 48-hour milking
Hydrocortison at the 48-hour milking
Sulfonamides at the 60-hour milking Thus in the case of penicillin and each of the others of the first five agents listed, the composition exhibited a 36-hour rating, the several substances being completely removed at the end of this period (three milkings) following the last treatment. Although in the above studies, nitrofurazone persisted through the 96-hour milking, additional tests have demonstrated that with the amount of this agent reduced to 60 mg. per 100 cc. of the composition, the milk is clear at the 72-hour interval. In other words, even where this notoriously persistent substance is employed, a milk-out rating of 60 hours can be readily achieved if desired. In the same further tests, the hydrocortisone level of the preparation was raised to 40 mg. per 10 cc., but there was again no residue at the 48-hour milking. Summarizing, these tests show that with antibiotics of major significance, including particularly penicillin, a 36-hour milk-out rating is readily attained, and likewise as to hydrocortisone. The rating for the more difficultly removable sulfa compounds would be 48 hours in the composition tested, but is capable of reduction with lesser amounts. Even if a substance such as nitrofurazone is included, although not generally regarded as the agent of choice, a 60-hour rating is attainable.

It will now be seen that the invention affords novel compositions and treatments for mastitis, e.g. by direct infusion of the liquid or semi-liquid preparation into the milk canal at each quarter of the udder, whereby the several criteria of such medication are realized in unusually satisfactory manner. Chemical instability or other adverse effects on the potency of the active substances are avoided, either in storage of the composition or after its infusion into the mammary regions, nor does the preparation contain ingredients, such as heavy grease bases or the like, which impede the access of the medication to the remote tissues of the mammary glands, for thorough actual contact with the mastitis-causing organisms. Full dispersibility in milk is achieved, and while the agents are not prematurely removed, the milk-out requirements are eminently satisfactory, in comparison with much longer times that are required of many prior products. Finally, the base is non-toxic, and indeed may be classifiable as edible, contributing no milk-out problems itself.

It is to be understood that the invention is not limited to the specific compositions and steps hereinabove described but may be carried out in other ways without departure from its spirit.

What is claimed is:

1. A composition for treating mastitis in milk animals by intramammary infusion, comprising:
   (a) an effective amount of an antibiotic substance for treating mastitis;
   (b) vegetable oil for carrying said antibiotic substance; and
   (c) alcohol-soluble fraction of natural lecithin phospholipid material for promoting dispersions of said oil in milk, selected from the class consisting of phosphatidyl choline and phosphatidyl ethanolamine and mixtures thereof and present in amount of at least about 0.25% of said oil.

2. A composition as defined in claim 1, in which at least the major part of the phospholipid material is phosphatidyl choline.

3. A composition as defined in claim 1, in which the vegetable oil is peanut oil.

4. A composition as defined in claim 1, in which the phospholipid material is present in amount of at least about 0.5% of said oil.

5. A composition as defined in claim 1, in which the phospholipid material is a mixture of phosphatidyl choline and phosphatidyl ethanolamine.

6. A composition as defined in claim 5, in which the major part of the phospholipid material is phosphatidyl choline, and said phospholipid material is present in amount of at least about 0.5% of said oil.

7. A composition as defined in claim 1, in which said antiobiotic substance is penicillin.

8. A composition as defined in claim 7, in which at least the major part of the phospholipid material is phosphatidyl choline.

9. A composition as defined in claim 8, in which said phospholipid material is present in amount of at least about 0.5% of said oil.

10. A composition as defined in claim 7, in which said phospholipid material is a mixture of phosphatidyl choline and phosphatidyl ethanolamine, and said material is present in amount from about 0.5% to about 7% of said oil.

11. A composition as defined in claim 7 which also contains at least one substance of the class consisting of polymixin, neomycin and dihydrostreptomycin, also carried by said oil.

12. A method of treating mastitis in milk animals, comprising administering to the affected mammary region by intramammary infusion a composition comprising:
   (a) an effective amount of an antibiotic substance for treating mastitis;
   (b) vegetable oil for carrying said antibiotic substance; and
   (c) alcohol-soluble fraction of natural lecithin phospholipid material for promoting dispersion of said oil in milk, selected from the class consisting of phosphatidyl choline and phosphatidyl ethanolamine and mixtures thereof and present in amount of at least about 0.25% of said oil.

13. A method as defined in claim 12 in which said antibiotic substance is penicillin.

14. A method as defined in claim 12, in which at least the major part of the phospholipid material is phosphatidyl choline.

15. A method as defined in claim 12 in which the phospholipid material is present in amount of at least about 0.5% of said oil.

16. A method as defined in claim 15 in which said antibiotic substance is penicillin and the phospholipid material is a mixture of phosphatidyl choline and phosphatidyl ethanolamine.

References Cited

UNITED STATES PATENTS

| | | | |
|---|---|---|---|
| 2,945,869 | 7/1960 | Meyer et al. | 424—199 |
| 3,016,330 | 1/1962 | Jacobsen | 424—271 |
| 3,049,473 | 8/1962 | Beatson et al. | 424—365 |
| 3,427,377 | 2/1969 | Bauer et al. | 424—271 |

OTHER REFERENCES

McCutcheon—Detergents & Emulsifiers Annual, 1966 ed. pages 60 and 1963 ed. page 34.

Lyman—American Pharmacy, J. B. Lippincott Co. 1945 page 362.

Chemmunique-Atlas Powder Co. vol. 9, No. 2 (March 1961) pp. 8–11.

SAM ROSEN, Primary Examiner

U.S. Cl. X.R.

424—199, 271, 365, 181, 227, 229, 240

UNITED STATES PATENT OFFICE
CERTIFICATE OF CORRECTION

Patent No. 3,636,194    Dated January 18, 1972

Inventor(s)   DOUGLAS G. PARIZEAU

It is certified that error appears in the above-identified patent and that said Letters Patent are hereby corrected as shown below:

Col. 1, line 6, for "Continuation-in-part" read --Continuation--

Col. 9, line 36, for "5° C." read --55° C.-- line 39, for "5° C." read --55° C.--; after "the" delete "5"

Col. 13, line 19, for "100 cc" read --10cc--

Signed and sealed this 11th day of July 1972.

(SEAL)
Attest:

EDWARD M.FLETCHER, JR.
Attesting Officer

ROBERT GOTTSCHALK
Commissioner of Patents